United States Patent
Lee

(10) Patent No.: US 7,105,957 B2
(45) Date of Patent: Sep. 12, 2006

(54) APPARATUS FOR FIXING STATOR OF RECIPROCATING COMPRESSOR

(75) Inventor: Sang-Min Lee, Gyeongsangnam-Do (KR)

(73) Assignee: Lg Electronics Inc., Seoul (KR)

( * ) Notice: Subject to any disclaimer, the term of this patent is extended or adjusted under 35 U.S.C. 154(b) by 0 days.

(21) Appl. No.: 11/023,445

(22) Filed: Dec. 29, 2004

(65) Prior Publication Data
US 2005/0140216 A1   Jun. 30, 2005

(30) Foreign Application Priority Data
Dec. 31, 2003   (KR) .................... 10-2003-0102288

(51) Int. Cl.
*H02K 41/00* (2006.01)
(52) U.S. Cl. .................... 310/14; 310/15; 310/23
(58) Field of Classification Search .......... 310/12–15, 310/23–24, 89, 254; 417/360, 417
See application file for complete search history.

(56) References Cited

U.S. PATENT DOCUMENTS

| | | | |
|---|---|---|---|
| 6,838,789 B1 * | 1/2005 | Kwon et al. ................. | 310/12 |
| 2003/0080634 A1 * | 5/2003 | Kwon et al. ................. | 310/15 |
| 2004/0251749 A1 * | 12/2004 | Hyun ........................ | 310/23 |
| 2005/0140217 A1 * | 6/2005 | Heo .......................... | 310/15 |

FOREIGN PATENT DOCUMENTS

| KR | 10-0273431 B1 | 1/2001 |
|---|---|---|
| KR | 10-0469463 B1 | 2/2005 |

* cited by examiner

*Primary Examiner*—Thanh Lam
(74) *Attorney, Agent, or Firm*—Birch, Stewart, Kolasch & Birch, LLP

(57) ABSTRACT

An apparatus for fixing a stator of a reciprocating motor includes: a frame fixedly installed in a case; a cylinder penetratingly inserted and coupled to the frame; a piston inserted in the cylinder and having a suction passage for sucking a refrigerant therein; an outer stator contacting with and supported by the frame; an inner stator formed as a cylindrical shape by laminating lamination sheets having a predetermined shape and inserted upon the frame or an outer circumferential surface of the cylinder so as to form a certain interval with an inner diameter of the outer stator; and a stator supporting means positioned at a stopping surface formed on the frame or the cylinder and supporting one side surface of the inner stator; wherein the stopping surface includes an inclined surface which is inclinedly formed such that the stator supporting means can be slidingly inserted thereinto.

Accordingly, the inner stator can be firmly coupled with other parts, and manufacturing with the constituting parts can be simplified.

20 Claims, 8 Drawing Sheets

APPARATUS FOR FIXING STATOR OF RECIPROCATING COMPRESSOR

BACKGROUND OF THE INVENTION

1. Field of the Invention

The present invention relates to a reciprocating compressor, and more particularly, to a reciprocating compressor which allows a stator of a motor to be firmly coupled with other parts.

2. Description of the Background Art

In general, a compressor converts electric energy into kinetic energy, and compresses a refrigerant by the kinetic energy. The compressor is the kernel of a freezing cycle system, and according to compression mechanisms, there are various kinds of compressors such as a rotary compressor, a scroll compressor, a reciprocating compressor and the like.

The reciprocating compressor is classified into one using a method for compressing a gas by converting rotation force of a rotary motor which generates rotation force into linear reciprocation and the other using a method for compressing a gas by a linearly reciprocating driving force of a linear motor which generates a linearly reciprocating driving force.

The reciprocating compressor using the linear motor includes: a frame; a linear motor for generating the linearly reciprocating driving force upon receiving the power; a compression unit for compressing a gas upon receiving the linearly reciprocating driving force of the linear motor; a resonance unit for resonating movement of the compression unit; and a valve unit for controlling gas flow.

The linear motor includes: an outer stator; an inner stator inserted into the outer stator; and a mover movably inserted between the outer stator and the inner stator.

The outer stator and the inner stator are formed as a cylindrical shape, respectively, and the outer stator and the inner stator are lamination bodies that in order to minimize loss of flux, a plurality of lamination sheets having a predetermined shape are radially laminated towards the center of the cylindrical shape so that the lamination sheets can make the cylindrical shape.

In general, the outer stator and the inner stator are fixedly coupled with the frame. The inner stator is constructed as the lamination body by radially laminating a plurality of lamination sheets having the predetermined shape so as to form the cylindrical shape whose inner circumferential surface makes a circle and whose inside is empty. Thereafter, a plurality of lamination sheets constituting the lamination body are fixed, and by penetrating the center of the fixed lamination body, the lamination body is fixedly coupled with the frame or an outer circumferential surface of the cylinder. Such a process of fixing and coupling the lamination sheets significantly affects efficiency of the motor.

Particularly, since an interval between the outer stator and the inner stator constituting the linear motor influences efficiency of the linear motor, the outer stator and the inner stator should be precisely coupled with each other so as to minimize the interval therebetween. In addition, since force applies at the lamination sheets constituting the lamination bodies when flux flows between the outer stator and the inner stator, the lamination sheets should be firmly fixed. If the outer stator and the inner stator are not firmly fixed but separated from each other in a state that the lamination sheets are coupled to each other, the outer stator and the inner stator will collide with the mover between the outer stator and the inner stator, thereby causing damages to parts.

SUMMARY OF THE INVENTION

Therefore, an object of the present invention is to provide an apparatus for fixing a stator of a reciprocating compressor which allows the stator of a motor to be firmly coupled with other parts.

To achieve these and other advantages and in accordance with the purpose of the present invention, as embodied and broadly described herein, there is provided an apparatus for fixing a stator of a reciprocating compressor, comprising: a frame fixedly installed in a case; a cylinder penetratingly inserted and coupled to the frame; a piston inserted in the cylinder and having a suction passage for sucking a refrigerant therein; an outer stator contacting with and supported by the frame; an inner stator formed as a cylindrical shape by laminating lamination sheets having a predetermined shape and inserted upon the frame or an outer circumferential surface of the cylinder so as to form a certain interval with an inner diameter of the outer stator; and a stator supporting means positioned at the frame or a stopping surface formed on the cylinder and supporting one side surface of the inner stator; wherein the stopping surface includes an inclined surface which is inclinedly formed such that the stator supporting means can be slidingly inserted thereinto.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, reference will now be made in detail to the preferred embodiments of an apparatus for fixing a stator of a reciprocating compressor of the present invention, examples of which are illustrated in the accompanying drawings.

Figure 1:
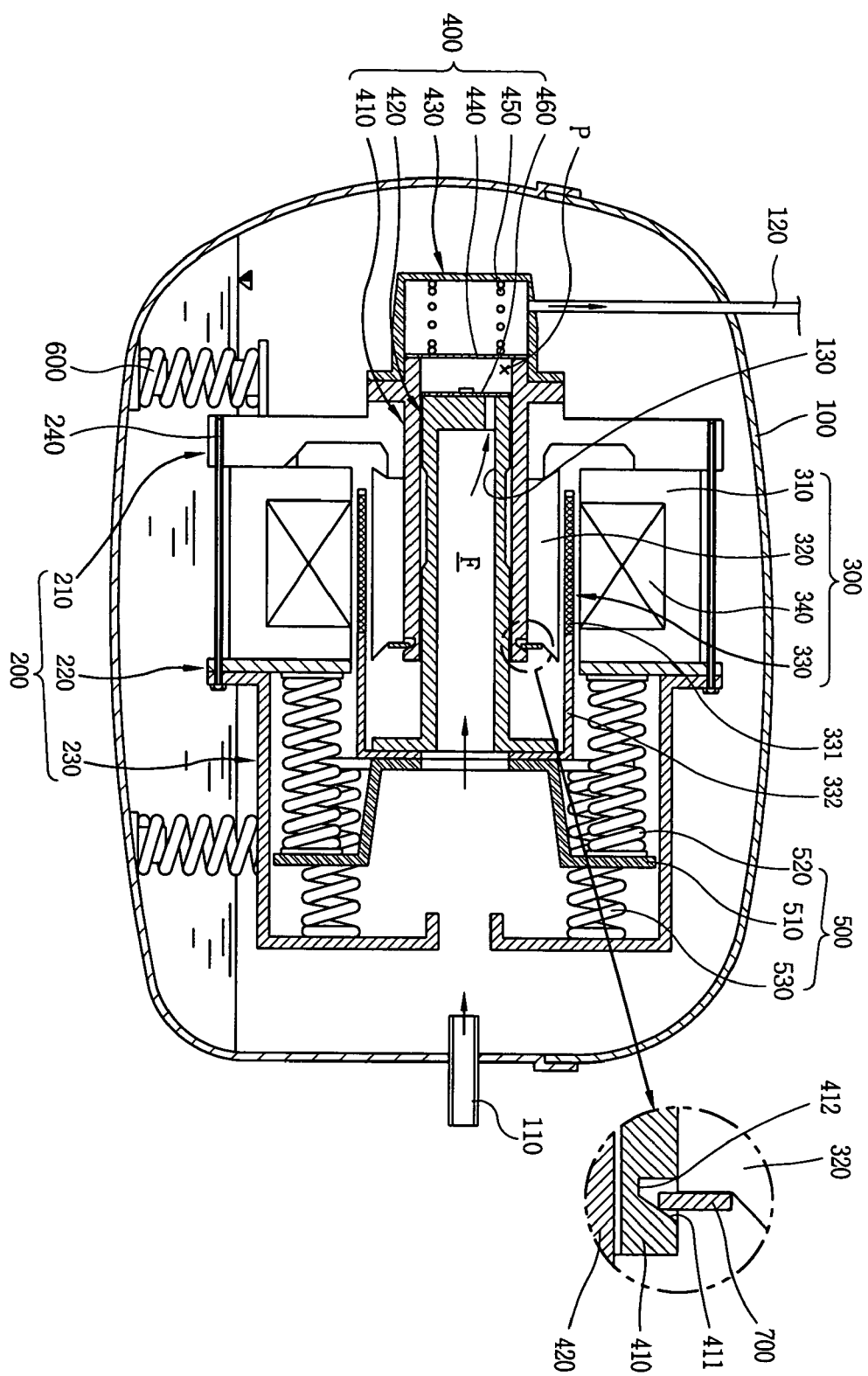
FIG. 1 is a cross-sectional view showing a reciprocating compressor provided with a first embodiment of the present invention.

FIG. 1 is a cross-sectional view showing a reciprocating compressor provided with a first embodiment of the present invention.

As shown therein, the reciprocating compressor includes: a casing 100 provided with a suction pipe 110 and a discharge pipe 120; a frame unit 200 positioned inside the casing 100; a motor 300 mounted at the frame unit 200 and generating a linearly reciprocating driving force; a compression unit 400 for compressing a gas upon receiving the driving force of the motor 300; and a resonance spring unit for resonating the driving force of the motor 300.

The frame unit 200 includes: a front frame 200 supporting one side of the motor 300 and coupled with the compression unit 400 therein; a middle frame 220 supporting the other side of the motor 300, leaving a certain interval from the front frame 210; and a rear frame 230 coupled with the middle frame 220 and having the resonance spring unit 500 positioned therein.

The motor 300 includes: an outer stator 310 fixed between the front frame 210 and the middle frame 230; an inner stator 320 inserted into the outer stator 310 at a certain interval; a mover 330 movably inserted between the outer stator 310 and the inner stator 320; and a winding coil 340 fixed in the outer stator 310. The mover 330 includes a magnet 331 and a magnet holder 332 for supporting the magnet 331.

The compression unit 400 includes: a cylinder 410 inserted between the front frame 210 and the inner stator 320 and fixedly coupled therebetween; a piston 420 movably inserted into the cylinder 410, forming a compression chamber (P) in which a refrigerant is compressed, and having a suction passage 130 for sucking the refrigerant thereinto; and a valve system coupled with the piston 420 and the cylinder 410.

The cylinder 410 is formed as a cylindrical shape, and forms a stopping groove 412, to which a stator supporting means 700 is insertedly fixed, at its one end to which the stator supporting means 700 is coupled. The stopping groove 412 has an inclined surface 411 which is inclinedly formed such that the stator supporting means 700 can be slidingly inserted thereinto and adhered closely to the inner stator 320.

The stator supporting means 700 has the "C" shape, is positioned at the stopping groove 412 formed on the cylinder 410 and supports one side surface of the inner stator 320.

In the present embodiment, the stopping groove and the inclined surface are formed on the cylinder 410. However, the following structure may be possible: the front frame 210 is expanded to an outer circumferential surface of the cylinder 410, and the stopping groove and the inclined surface are formed on the expanded front frame 210, thereby supporting the inner stator 320 by the stator supporting means.

Figure 2:
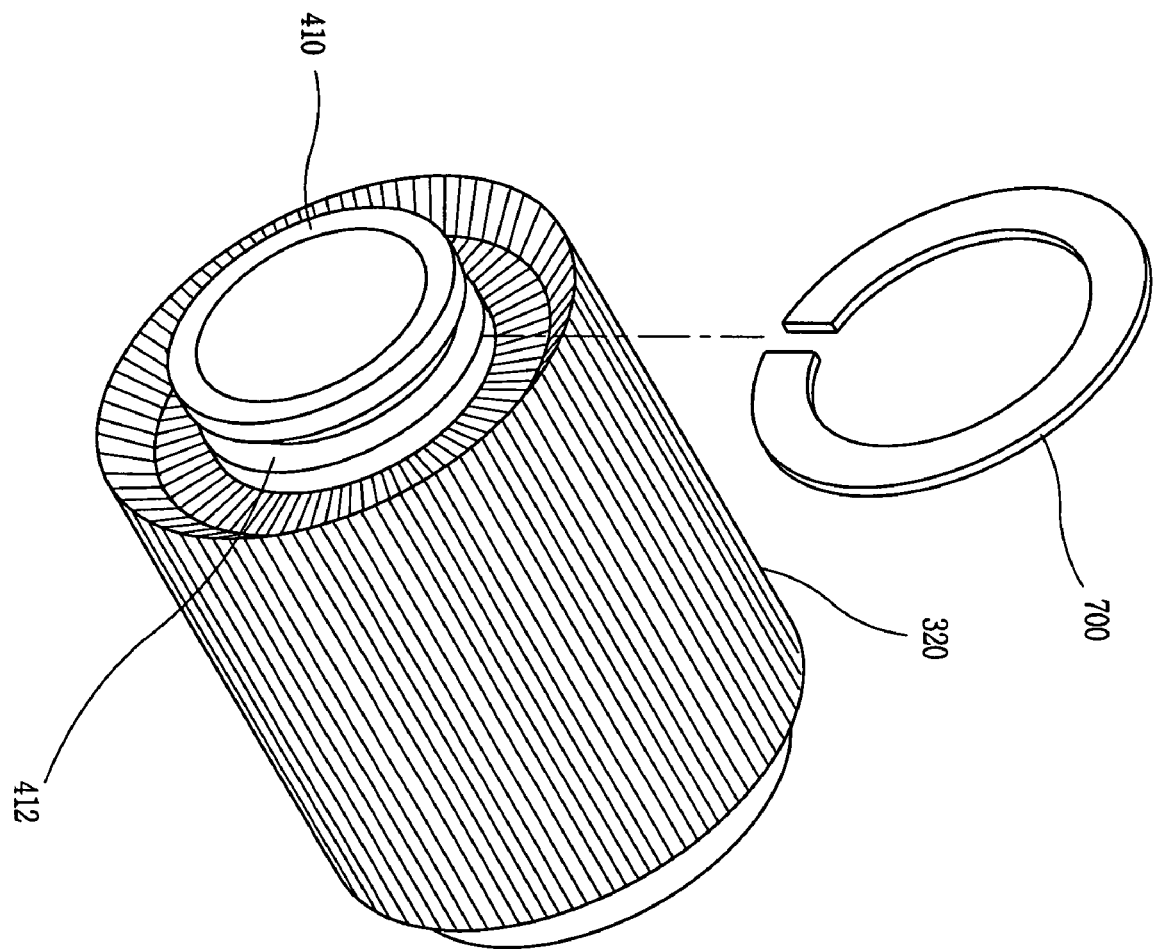
FIG. 2 is a perspective exploded view of a stator supporting means in accordance with the first embodiment of the present invention.

By laminating a plurality of lamination sheets as a cylindrical shape, the inner stator 320 is inserted upon the outer circumferential surface of the cylinder. One side of the inner stator 320 is fixed closely to an inner surface of the front frame 210, and the other side is supported by the stator supporting means 700 of the "C" ring shape which is inserted upon the cylinder 410. FIG. 2 shows how the inner stator 320 and the stator supporting means 700 are coupled to each other.

As shown in FIG. 1, the resonance spring unit 500 includes: a spring support 510 coupled with a connection portion of the mover 330 and the piston 420; a front resonance spring 520 for supporting the front on the basis of the spring support 510; and a rear resonance spring 530 for supporting the rear of the spring support 510.

The valve system includes: a discharge cover 430 mounted at one side of the front frame 210 and covering the compression chamber (P) of the cylinder; a discharge valve 440 positioned in the discharge cover 430 and opening or closing the compression chamber (P) of the cylinder 410; a discharge spring 450 positioned in the discharge cover 430 and supporting the discharge valve 440; and a suction valve 460 mounted at an end portion of the piston 420 and controlling flow of the refrigerant flowing into the compression chamber (P) of the cylinder.

Undescribed reference marks 240 and 600 are a coupling bolt and a support spring, respectively.

Operational effects of the reciprocating compressor of the present invention will be described as follows.

When the power is applied to the outer stator 310 of the motor 300, flux is generated between the outer stator 310 and the inner stator 320, and thus the mover 330 and the piston 420 move together according to a direction of the flux. At the same time, the piston 420 linearly reciprocates in the cylinder 410 by the resonance spring unit 500 to thereby generate the pressure difference in the compression chamber (P) of the cylinder 410. Accordingly, the refrigerant is sucked into the compression chamber (P) through the suction passage 130, compressed to a certain pressure, and is discharged. Such processes are repeated.

Herein, as described above, the inner stator 320 is supported by the stator supporting means 700 whose one side is fixed into and is adhered closely to the stopping groove 412 after the supporting means 700 is inserted upon the outer circumferential surface of the cylinder 410.

Figure 3:
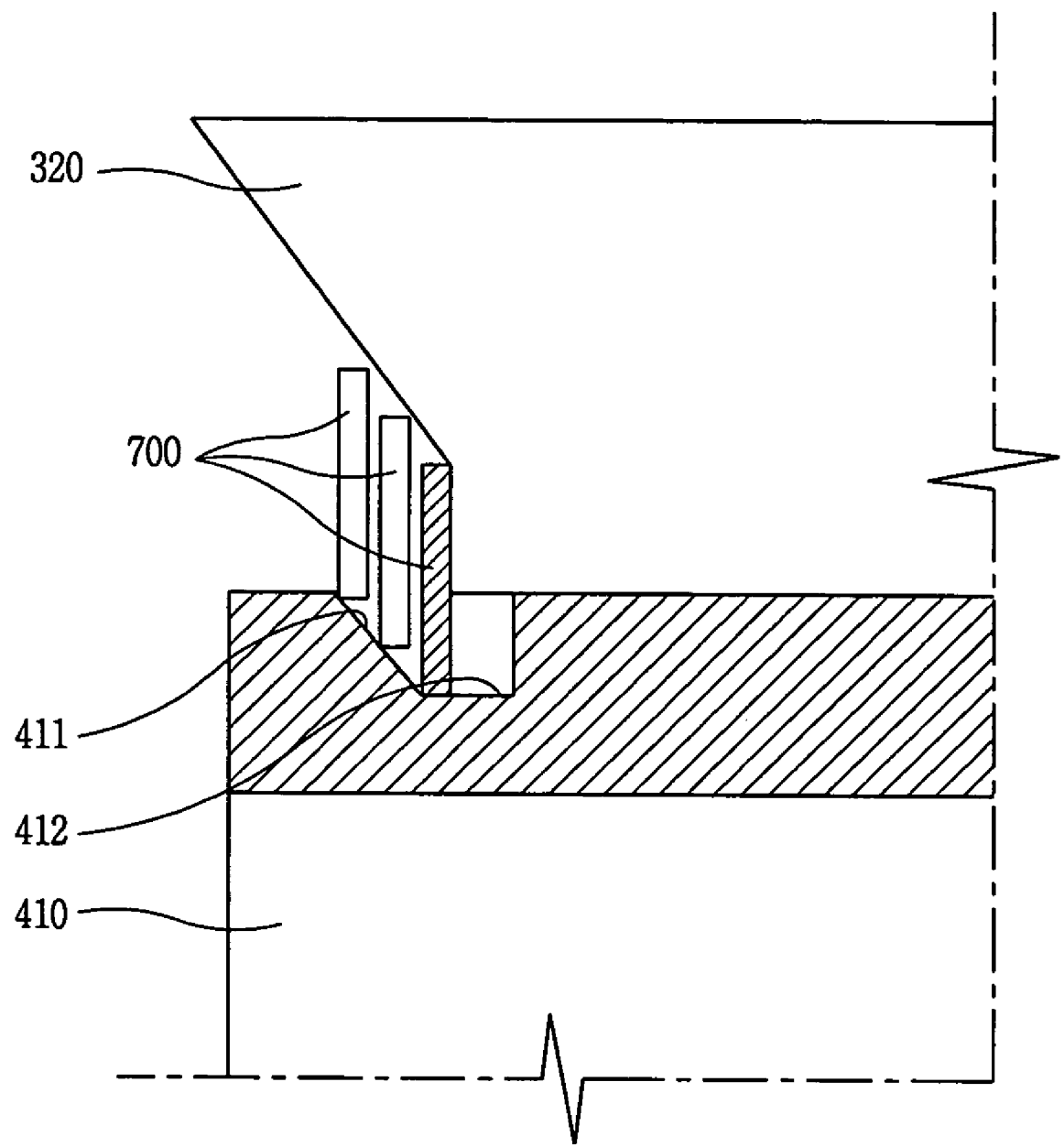
FIG. 3 is a cross-sectional view showing the coupling of the stator supporting means in accordance with the first embodiment of the present invention.

More in detail, as shown in FIG. 3, as the stopping groove 412 is provided with the inclined surface 411 which is inclined in a direction in which the inner stator 320 exists, when the stator supporting means 700 is inserted upon the stopping groove 412, the stator supporting means 700 gets stretched and then tight, slides along the inclined surface 411, and then is adhered closely to one side surface of the inner stator 320.

At this time, if the stopping groove 412 is too wide in width, the stator supporting means 700 cannot be in contact with the inner stator 320 but may be loose. Therefore, the width of the stopping groove 412 should not be much greater than the length of a portion where the inner stator 320 protrudes at an upper side of the stopping groove 412.

In the present invention, by firmly fixing the inner stator constituting the motor, assembly tolerance between parts is precisely maintained during the operation of the compressor to thereby not only increase reliability but also prevent damages to the parts due to separation of the assembled parts. In addition, as a job of fixing the inner stator constituting the motor is simplified and the constituting parts become simple, assembly productivity can be increased. Moreover, as an assembly body in which the front frame, the cylinder and the inner stator are assembled is decreased in size in a radial direction, a size of the reciprocating compressor can be reduced as a whole.

Another embodiment of the present invention will be described as follows.

Figure 4:
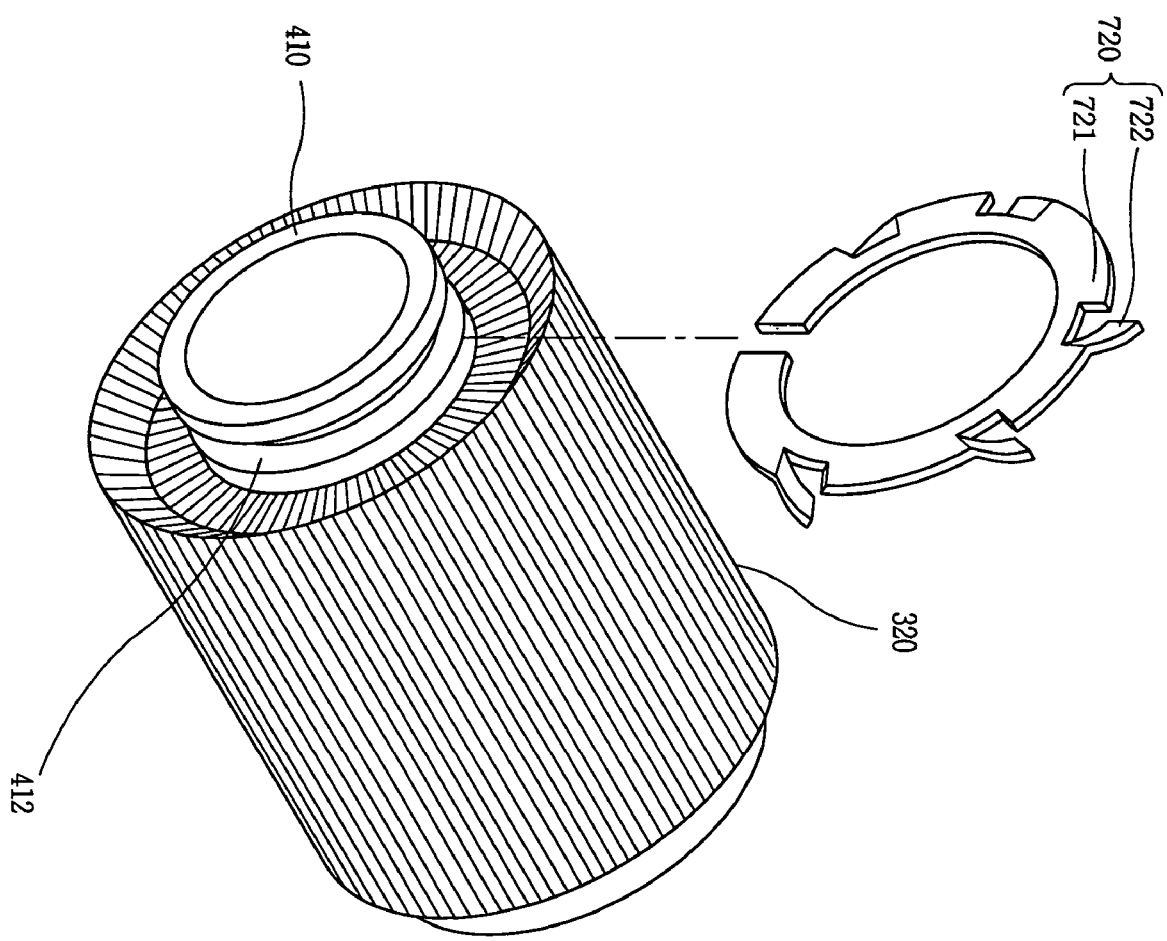
FIG. 4 is a perspective exploded view of a stator supporting means in accordance with a second embodiment of the present invention.

FIG. 4 is a perspective exploded view of a stator supporting means in accordance with a second embodiment of the present invention.

As shown therein, the stator supporting means 720 includes: a body 721 forming the "C" shape having a predetermined thickness and coupled with the stopping surface 412; and a plurality of elastically supporting portions 722 protrudingly formed at regular intervals along an outer circumferential surface of the body 721 and elastically supporting one side surface of the inner stator 320.

The elastic supporting portion 722 is formed in a such a manner that the body is cut inwardly and radially from the inner circumferential surface of the body 721 at a predetermined depth, is cut again in a circumferential direction at a predetermined distance, and is bent from the end of the cut surface towards the inner stator 320.

An operation of the second embodiment of the present invention will be described as follows.

Figure 5:
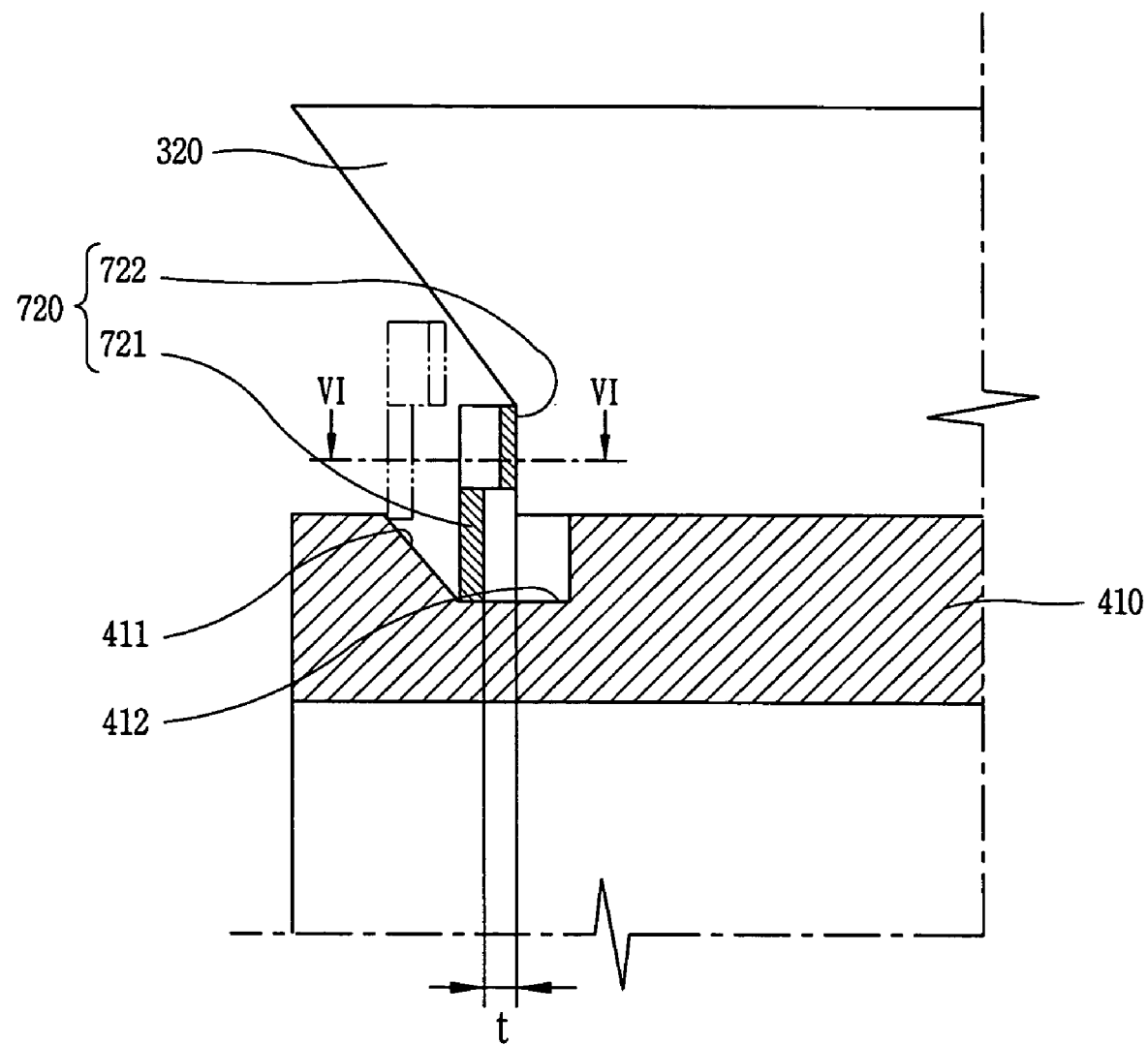
FIG. 5 is a cross-sectional view showing the coupling of the stator supporting means in accordance with the second embodiment of the present invention.
Figure 6:
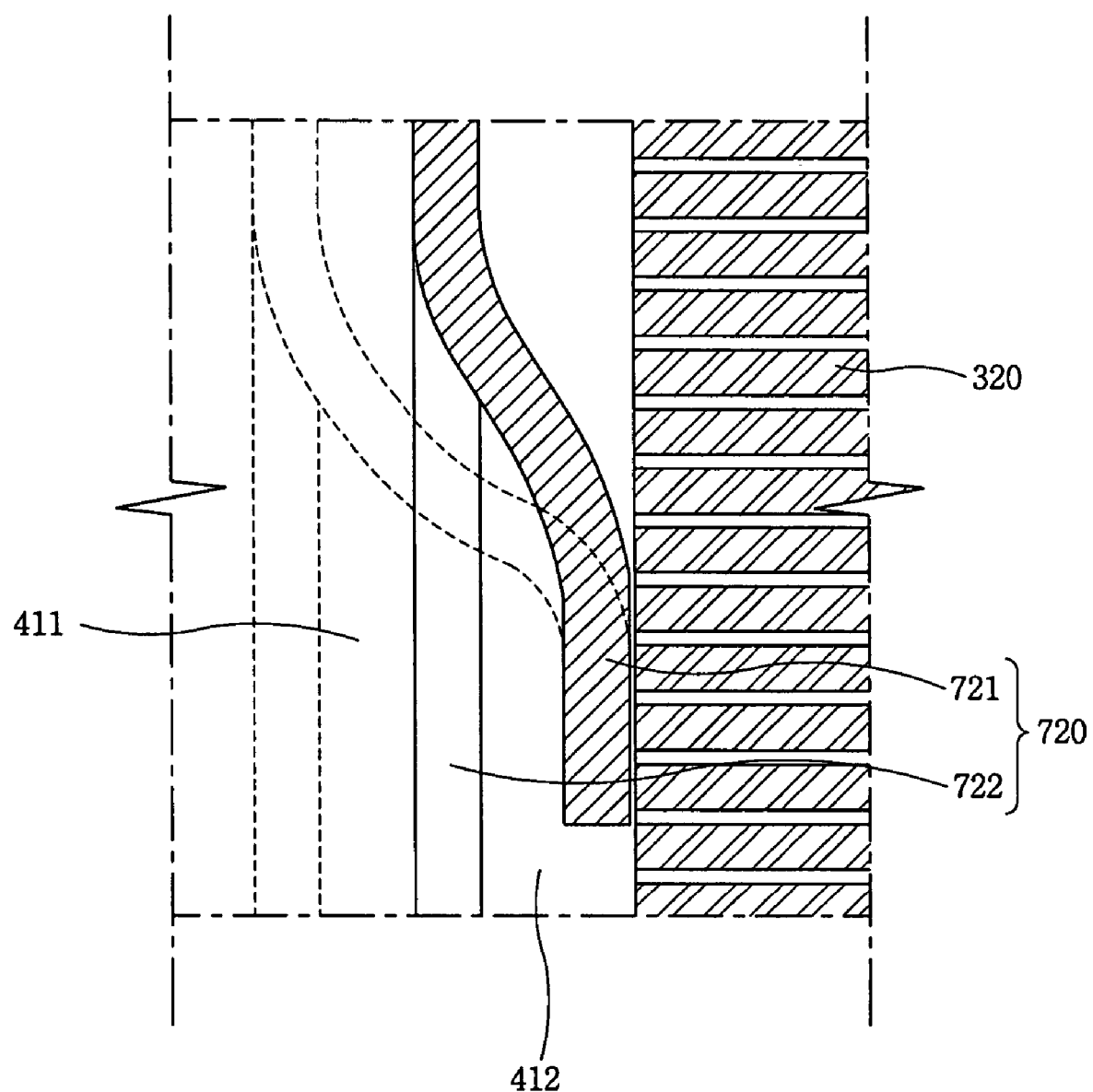
FIG. 6 is a cross-sectional view taken along line VI—VI of FIG. 5.

FIG. 5 is a cross-sectional view showing the coupling of the stator supporting means in accordance with the second embodiment of the present invention, and FIG. 6 is a cross-sectional view taken along line VI—VI of FIG. 5.

As shown therein, as the stopping groove 412 is provided with the inclined surface 411 which is inclined in a direction in which the inner stator 320 exists, when a stator supporting means 720 is inserted upon the stopping surface 412, the stator supporting means 720 gets stretched and then tight, slides along the inclined surface 411, and is adhered closely to one side surface of the inner stator 320.

At this time, even though the length of a portion where the inner stator 320 protrudes at an upper side of the stopping groove 412 is long or short due to processing errors, the elastically supporting portion 722 elastically supports one side surface of the inner stator 320, thereby preventing the stator supporting means from being loose and firmly fixing the inner stator 320.

Figure 7:
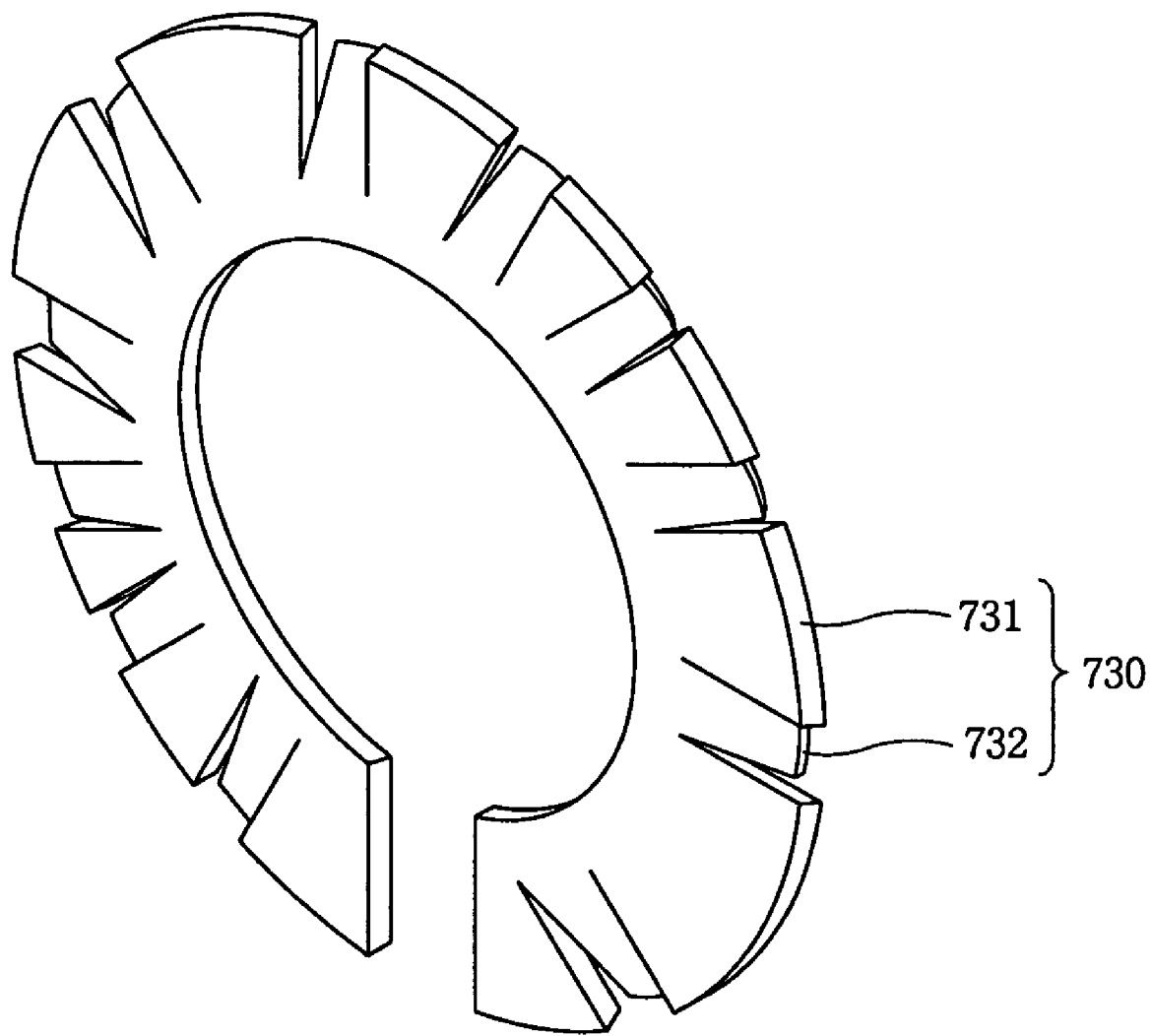
FIG. 7 is a perspective view showing a stator supporting means in accordance with a third embodiment of the present invention.

A third embodiment of the present invention will be described as follows. FIG. 7 is a perspective view showing a stator supporting means in accordance with the third embodiment of the present invention.

As shown therein, the stator supporting means 730 includes: a body 731 forming the "C" shape having a predetermined thickness and coupled with the stopping surface; and a plurality of elastically supporting portions 732 which are constructed by cutting the body 731 from an outer circumferential surface towards the center at a predetermined depth and then bending the cut body from the end of the cut surface towards the inner stator, for elastically supporting one side surface of the inner stator.

Figure 8:
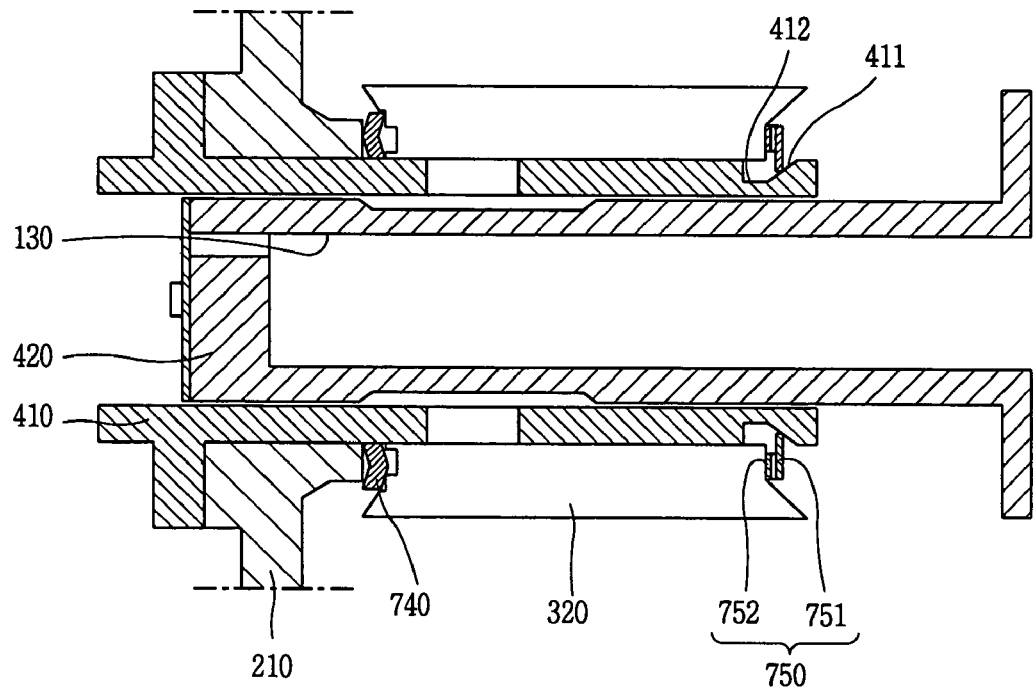
FIG. 8 is a cross-sectional view showing a stator supporting means in accordance with a fourth embodiment of the present invention.

A fourth embodiment of the present invention will be described as follows. FIG. 8 is a cross-sectional view showing a stator supporting means in accordance with a fourth embodiment, and FIG. 9 is a perspective view showing a first stator supporting means in accordance with the fourth embodiment.

As shown therein, the stator supporting means includes: a first supporting means 740 interposed between one side of the inner stator 320 and the front frame 210 adjacent to the inner stator; and a second stator supporting means 750 supporting the other side of the inner stator 320 and positioned at the stopping groove 412 formed on the cylinder 410.

The first stator supporting means 740 has a ring shape or the "C" shape, and is preferably formed of materials having a certain elasticity-such as rubber or leather such that the first stator supporting means can be pressed when the inner stator 320 is inserted and can support the front of the inner stator 320.

Figure 9:
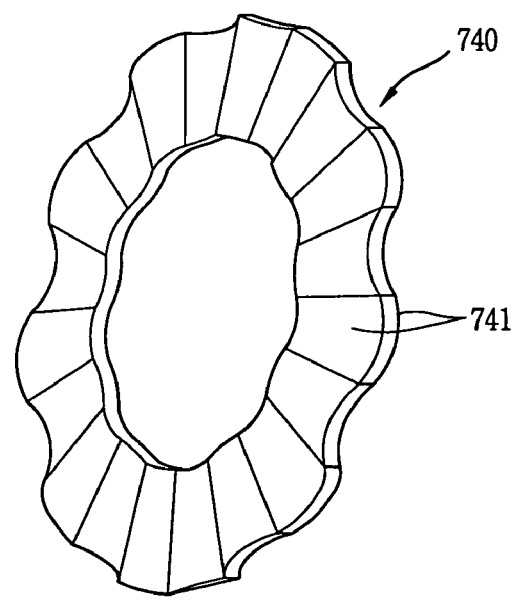
FIG. 9 is a perspective view showing a first stator supporting means in accordance with the fourth embodiment of the present invention.

In addition, as shown in FIG. 9, the first stator supporting means 740 can form an elastically supporting portion 741 which is successively curved as a ring shape.

As shown in the second embodiment, the second stator supporting means 750 includes: a body 751 forming the "C" shape having a predetermined thickness and coupled with the stopping surface 412; and a plurality of elastically supporting portions 752 protrudingly formed at regular intervals along an outer circumferential surface of the body 751 and elastically supporting one side surface of the inner stator 320.

Moreover, as shown in the third embodiment, the second stator supporting means 750 includes: a body forming the "C" shape having a predetermined thickness and coupled with the stopping surface; and a plurality of elastically supporting portions which are constructed by cutting the body from an outer circumferential surface towards the center at a predetermined depth and then bending the cut body from the end of the cut surface towards the inner stator, for elastically supporting one side surface of the inner stator. In the present embodiment, the stopping groove and the inclined surface are formed on the cylinder 410. However, the following construction can be possible: the front frame 210 is expanded to an outer circumferential surface of the cylinder 410, the stopping groove and the inclined surface are formed on the expanded front frame 210, and thus the stopping groove and the inclined surface support the inner stator 320 by the second stator supporting means 750.

As so far described, in the reciprocating compressor of the present invention, by firmly fixing the inner stator constituting the motor, assembly tolerance between parts is precisely maintained during the operation of the compressor to thereby not only increase reliability but also prevent damages to the parts due to separation of the assembled parts.

In addition, as a job of fixing the inner stator constituting the motor is simplified and the constituting parts become simple, assembly productivity can be increased.

Moreover, as an assembly body in which the front frame, the cylinder and the inner stator are assembled is decreased in size in a radial direction, a size of the reciprocating compressor can be reduced as a whole.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for fixing a stator of a reciprocating compressor, comprising:
    a frame fixedly installed in a case;
    a cylinder penetratingly inserted and coupled to the frame;
    a piston inserted in the cylinder and having a suction passage for sucking a refrigerant therein;
    an outer stator contacting with and supported by the frame;
    an inner stator formed as a cylindrical shape by laminating lamination sheets having a predetermined shape and inserted upon the frame or an outer circumferential surface of the cylinder so as to form a certain interval with an inner diameter of the outer stator;

a stopping groove having a bottom surface, one generally perpendicular side surface, and a stopping surface inclined to the generally perpendicular side surface, the stopping grove being located in the cylinder or the frame; and a stator supporting means positioned at the bottom surface and at the stopping surface of the stopping groove for fixing the stator.

2. The apparatus of claim 1, wherein the stator supporting means comprises:

a body forming the "C" shape having a predetermined thickness and coupled with the stopping surface; and a plurality of elastically supporting portions protrudingly formed at regular intervals along an outer circumferential surface of the body and elastically supporting one side surface of the inner stator.

3. The apparatus of claim 2, wherein the elastically supporting portion is formed by cutting the body towards the center at a predetermined depth and then bending the cut body from the end of the cut surface towards the inner stator.

4. The apparatus of claim 2, wherein the elastically supporting portion is formed by cutting the body from an inner circumferential surface towards the center at a predetermined depth and then bending the cut body from the end of the cut surface towards the inner stator.

5. The apparatus of claim 1, wherein the stator supporting means comprises:

a first supporting means interposed between one side of the inner stator and the front frame adjacent to the inner stator, and a second stator supporting means supporting the other side of the inner stator and positioned at the stopping groove formed on the cylinder.

6. The apparatus of claim 5, wherein the first stator supporting means is constructed as a ring shape.

7. The apparatus of claim 5, wherein the first stator supporting means is constructed as the "C" shape.

8. The apparatus of claim 5, wherein the first stator supporting means is formed of materials having a certain elasticity.

9. The apparatus of claim 5, wherein the first stator supporting means includes an elastically supporting portion which is successively curved and in contact with one side of the inner stator.

10. The apparatus of claim 5, wherein the second stator supporting means comprises:

a body forming the "C" shape having a predetermined thickness and coupled with the stopping surface; and a plurality of elastically supporting portions protrudingly formed at regular intervals along an outer circumferential surface of the body and elastically supporting one side surface of the inner stator.

11. The apparatus of claim 10, wherein the elastically supporting portion is formed by cutting the body towards the center at a predetermined depth and then bending the cut body from the end of the cut surface towards the inner stator.

12. The apparatus of claim 10, wherein the elastically supporting portion is formed by cutting the body from an outer circumferential surface towards the center at a predetermined depth and then bending the cut body from the end of the cut surface towards the inner stator.

13. The apparatus of claim 1, wherein the stator supporting means comprises a generally circular body having an outer circumference.

14. The apparatus of claim 13, wherein the body has a generally circular aperture in a central portion thereof defining an inner circumference.

15. The apparatus of claim 14, wherein the body includes a radially extending slot extending from the outer circumference to the inner circumference.

16. The apparatus of claim 14, wherein the body has a first face on one side thereof extending from the outer circumference to the inner circumference.

17. The apparatus of claim 16, wherein the body has a second face on a second side thereof opposite to the first side, the second face extending from the outer circumference to the inner circumference.

18. The apparatus of claim 17, wherein the first face is in contact with the inner stator.

19. The apparatus of claim 18, wherein a boundary surface between the second face and the inner circumference is in contact with the stopping surface.

20. The apparatus of claim 18, wherein the inner circumference is in contact with the stopping surface.

* * * * *